(No Model.)
A. SHEARER & R. R. CLAPP.
PROCESS OF MAKING PHOSPHORUS.
No. 527,163. Patented Oct. 9, 1894.
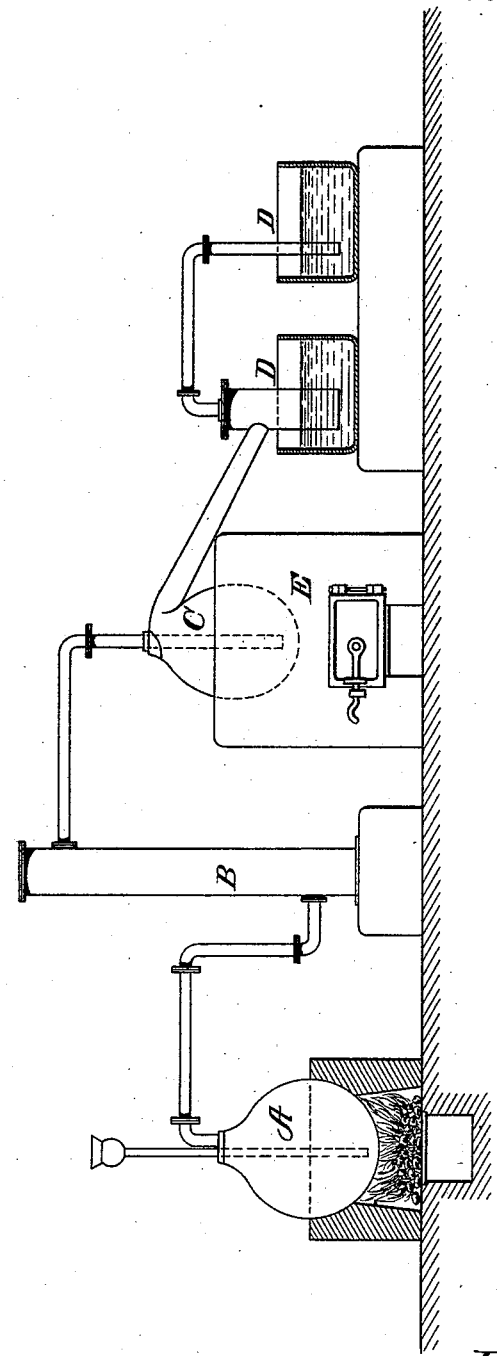
Witnesses
H. G. Rogers.
W. R. Edelen.
Inventors.
A. Shearer & R. R. Clapp
by Pollok & Mauro,
their attorneys.

UNITED STATES PATENT OFFICE.

ARTHUR SHEARER AND RALPH R. CLAPP, OF LONDON, ENGLAND.

PROCESS OF MAKING PHOSPHORUS.

SPECIFICATION forming part of Letters Patent No. 527,163, dated October 9, 1894.

Application filed May 10, 1894. Serial No. 510,781. (No specimens.)

*To all whom it may concern:*

Be it known that we, ARTHUR SHEARER, analytical chemist, a subject of the Queen of Great Britain and Ireland, and RALPH ROGER CLAPP, analytical chemist, a citizen of the United States, residing, respectively, at 173 Ham Park Road and 153 Earlham Grove, Forest Gate, London, in the county of Essex, England, have invented certain Improvements in the Manufacture or Production of Phosphorus and Compounds Thereof, of which the following is a specification.

This invention relates to the manufacture, or production, of phosphorus from phosphate of alumina; and especially from native phosphate of alumina which usually contains phosphate of iron.

According to our invention we subject the phosphate to heat in the presence of hydrochloric acid gas, a metallic chlorid and carbon. The metallic chlorid used may, for instance, be chlorid of sodium, or of potassium, or of calcium, or a mixture of these, and the carbon may for instance, be wood charcoal, coal, or coke. The solid materials employed should be ground or finely divided and intimately mixed, and be introduced into a closed vessel, or retort, provided with an inlet for the hydrochloric acid gas and an outlet for the produced vapors and gases. The materials are subjected to an elevated temperature say a red heat and hydrochloric acid gas is passed over into, or through, the materials during heating.

The production of phosphorus according to our invention depends upon the property possessed by phosphate of alumina, of forming under the described conditions the double chlorid of aluminium and sodium (if chlorid of sodium be used) or of aluminium and other metal, thus setting free the phosphoric anhydrid which can readily be reduced to phosphorus by carbon.

While the process is not dependent upon the use of any special form of apparatus, it may be conveniently carried out by means such as illustrated in the accompanying drawing, which is a view in side elevation, partly in vertical section.

A represents a retort, set in a suitable furnace, for generating hydrochloric acid gas.

B represents a tower containing pumice stone wet with sulfuric acid or with other suitable drying material through which the hydrochloric acid gas passes. This, or some equivalent means of removing moisture from the hydrochloric acid gas, is preferably employed.

From tower B, the gas passes to a retort C set in a furnace E, the solid materials (phosphate of alumina, metallic chlorid and carbon) having been ground and intimately mixed, as above stated, and placed in said retort.

We do not limit ourselves to precise proportions of the materials, but the following answer well; native phosphate of alumina (containing for example forty-seven per cent. of anhydrous phosphoric acid) one hundred parts (by weight); common salt one hundred and twenty parts, and carbon thirty-two parts.

By the reaction between the phosphate of alumina, chlorid of sodium (or of other metal) and gaseous hydrochloric acid at a high temperature in the presence of carbon, a double chlorid of aluminium and sodium (or other metal) is formed, the phosphoric anhydrid previously combined with the alumina being set free and finally reduced by the carbon to phosphorus. The chemical reactions are represented by the following formula:

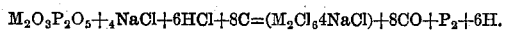

$$M_2O_3P_2O_5 + 4NaCl + 6HCl + 8C = (M_2Cl_6 4NaCl) + 8CO + P_2 + 6H.$$

The proportions of materials required according to those chemical equations differ somewhat from those given above as an example of the proportions used in practice. The reason for this difference is that it is preferred in practice to employ an excess of the chlorid and also of carbon.

The reaction in reality proceeds in two stages. The first, represented by the formula $M_2O_3P_2O_5 + 4NaCl + 6HCl + 3C = (Al_2Cl_6 4NaCl) + 6H + 3CO + P_2O_5$, requires a full red heat and is finished in about ten hours, when the evolution of carbonic oxid and hydrogen gases ceases. The temperature is then increased to near whiteness when carbonic oxid gas and phosphorus begin to come over, according to the equation $P_2O_5 + 5C = P_2 + 5CO$. The distillation of the phosphorus is continued as long as it comes over, the second stage usually lasting about thirty hours, but this depends upon the amount of phosphorus present.

Although it is accurate to regard the process as having two stages, the fact is that some phosphorus is liberated during the first stage, and to a certain extent the formation of double chlorid and phosphorus proceed simultaneously. The bulk of the phosphorus, however, distills over between the tenth and the thirtieth hours of the operation.

The phosphorus which distills over can be collected under water as indicated in the vessels D D and purified in the usual or in any suitable way. It can be burned to form phosphorus acid, and phosphoric acid, or can be utilized to form other compounds of phosphorus.

It is preferred to calcine the phosphate of alumina employed in the process before grinding it.

We claim—

1. The manufacture or production of phosphorus from phosphate of alumina by subjecting phosphate of alumina to heat in the presence of hydrochloric acid gas, a metallic chlorid and carbon substantially as hereinbefore described.

2. In the manufacture or production of phosphorus, the improvement consisting in mixing ground or finely divided metallic chlorid and carbon, and calcined phosphate of alumina, and subjecting them to heat in a closed vessel or retort in the presence of dried hydrochloric acid gas, substantially as hereinbefore described.

In testimony whereof we have signed our names to this specification in the presence of two subscribing witnesses.

A. SHEARER.
R. R. CLAPP.

Witnesses:
  WM. JOHN WEEKS,
  FRED SOATER,
*Both of 31 Lombard Street, London, E. C.*